US010125900B2

(12) United States Patent
Penrod (10) Patent No.: US 10,125,900 B2
(45) Date of Patent: Nov. 13, 2018

(54) DEVICE TO PREVENT ENTRY BY RODENTS AND OTHER SUCH PESTS INTO A RECREATIONAL VEHICLE'S SERVICE COMPARTMENT

(71) Applicant: Gary Penrod, Yucaipa, CA (US)

(72) Inventor: Gary Penrod, Yucaipa, CA (US)

( * ) Notice: Subject to any disclaimer, the term of this patent is extended or adjusted under 35 U.S.C. 154(b) by 22 days.

(21) Appl. No.: 15/002,126

(22) Filed: Jan. 20, 2016

(65) Prior Publication Data
US 2017/0203703 A1    Jul. 20, 2017

(51) Int. Cl.
| *F16L 5/10* | (2006.01) |
| *B60R 99/00* | (2009.01) |
| *A01M 99/00* | (2006.01) |
| *B60R 13/08* | (2006.01) |

(52) U.S. Cl.
CPC ............... *F16L 5/10* (2013.01); *A01M 99/00* (2013.01); *B60R 13/0846* (2013.01); *B60R 99/00* (2013.01); *B60R 2099/005* (2013.01)

(58) Field of Classification Search
CPC ...................................................... B60R 13/06
USPC ........................................................ 296/208
See application file for complete search history.

(56) References Cited

U.S. PATENT DOCUMENTS

| 1,635,749 | A | * | 7/1927 | Hosmer | ................... E21B 33/06 166/85.4 |
| 1,784,667 | A | * | 12/1930 | Gillet | ..................... F16B 21/16 285/415 |
| 2,237,680 | A | * | 4/1941 | Mark | ........................ E03B 5/06 277/329 |
| 2,813,692 | A | * | 11/1957 | Peterson | .............. H01B 17/306 174/152 R |
| 3,161,906 | A | * | 12/1964 | Yarm | .................... H02G 3/0616 16/2.1 |
| 3,506,999 | A | * | 4/1970 | Neher | ....................... B66B 7/06 16/2.1 |
| 3,666,134 | A | * | 5/1972 | Rauch | ................... E05B 65/006 174/50 |
| 3,761,114 | A | * | 9/1973 | Blakeley | ................. F16L 23/02 24/517 |
| 3,918,667 | A | * | 11/1975 | Madden | ..................... F16L 5/00 248/300 |
| 3,941,159 | A | * | 3/1976 | Toll | ........................ F16L 59/022 138/147 |
| 4,086,736 | A | * | 5/1978 | Landrigan | .................. F16L 5/04 248/56 |
| 4,377,291 | A | | 3/1983 | Albertini | |

(Continued)

*Primary Examiner* — Hilary L Gutman
(74) *Attorney, Agent, or Firm* — Kenneth Avila (57) ABSTRACT

A pest seal for a recreational vehicle (RV) to seal the gap that exists between a hose and/or cable passing through an access port located within the service compartment of a RV. The pest seal is comprised of two halves that are joined together along a single edge with mirrored cutouts that are lined with a compressible foam formed along the joining edge so that when the two halves are brought together the cutouts allow for the passage of a hose or cable through the pest seal. Embodiments further comprise a semicircular flange formed on the underside of each halve of a radius slightly smaller than the radius of the access port or a hinge attaching the two halves at one end of the edge where the halves are joined. The halves may be joined together by any number of means such as but not limited to magnets, hook and loop fabric, and mechanical latches.

5 Claims, 10 Drawing Sheets

(56) References Cited

U.S. PATENT DOCUMENTS

| | | | | |
|---|---|---|---|---|
| 4,993,724 A * | 2/1991 | Hauff | ........................ | F16L 5/08 277/606 |
| 5,235,134 A * | 8/1993 | Jaycox | ................ | G02B 6/4444 156/49 |
| 5,290,073 A * | 3/1994 | Chen | ........................ | F16L 5/08 277/621 |
| 5,330,233 A * | 7/1994 | Kress | ................ | F16L 3/1075 248/316.5 |
| 5,509,099 A * | 4/1996 | Hermsen | .............. | G02B 6/4442 385/134 |
| 5,561,268 A * | 10/1996 | Dagan | ................ | G02B 6/4422 174/92 |
| 5,639,993 A * | 6/1997 | Ideno | ................ | B60R 16/0222 174/153 G |
| 6,010,134 A * | 1/2000 | Katoh | ................ | B60R 16/0222 174/152 G |
| 6,218,625 B1 * | 4/2001 | Pulaski | ............... | B60R 16/0222 174/153 G |
| 6,291,774 B1 * | 9/2001 | Williams | ................ | H01B 17/00 174/135 |
| 6,417,453 B1 * | 7/2002 | Lapp | .................... | H02G 15/013 174/93 |
| 6,627,817 B1 * | 9/2003 | Kortenbach | ........... | H02G 3/083 174/541 |
| 6,889,909 B2 * | 5/2005 | Kobayashi | ............ | F25B 41/062 236/92 B |
| 7,141,744 B2 * | 11/2006 | Cloutier | ................. | A47B 21/06 16/2.1 |
| 7,308,183 B2 * | 12/2007 | Kowalczyk | .......... | G02B 6/4444 385/135 |
| 7,330,628 B1 * | 2/2008 | Kowalczyk | .......... | G02B 6/4444 385/135 |
| 7,648,384 B2 * | 1/2010 | Desissard | .......... | H01R 13/5213 174/67 |
| 7,689,090 B2 * | 3/2010 | Kluwe | ................. | G02B 6/4444 385/134 |
| 7,723,622 B2 * | 5/2010 | Dukes | ...................... | H02G 3/22 16/2.2 |
| 8,055,114 B2 * | 11/2011 | Kluwe | ................. | G02B 6/4444 385/134 |
| D653,099 S * | 1/2012 | Sempliner | ...................... | D8/356 |
| 8,128,132 B2 | 3/2012 | Cravens | | |
| 8,266,854 B2 * | 9/2012 | Reddicliffe | ....... | E04F 15/02405 52/220.8 |
| 8,290,329 B2 * | 10/2012 | Kowalczyk | .......... | G02B 6/4444 385/135 |
| 8,507,798 B2 * | 8/2013 | Sempliner | ............. | E04F 15/024 16/2.1 |
| 8,889,993 B1 * | 11/2014 | Misevich | ................. | H01B 17/24 174/135 |
| 8,957,314 B2 * | 2/2015 | Niles | ........................ | H02G 7/00 174/138 F |
| 9,246,315 B2 * | 1/2016 | Boyd | ........................ | F16L 5/04 |
| 9,365,170 B2 * | 6/2016 | Gronowicz, Jr. | ... | B60R 16/0222 |
| 9,685,770 B2 * | 6/2017 | Park | ........................ | H02G 3/22 |
| 2003/0079897 A1 * | 5/2003 | Sempliner | .......... | E04F 15/02405 174/486 |
| 2005/0221028 A1 | 10/2005 | Westcott | | |
| 2006/0207792 A1 * | 9/2006 | Sakurai | .................... | E04F 17/08 174/267 |
| 2008/0168720 A1 | 7/2008 | Thiim | | |
| 2009/0302034 A1 * | 12/2009 | Makela | ................ | H02G 3/0658 220/3.8 |
| 2010/0307817 A1 * | 12/2010 | Roy | ........................ | H02G 3/185 174/666 |
| 2012/0048616 A1 * | 3/2012 | Breen, IV | ................ | H02G 3/22 174/651 |

* cited by examiner

DEVICE TO PREVENT ENTRY BY RODENTS AND OTHER SUCH PESTS INTO A RECREATIONAL VEHICLE'S SERVICE COMPARTMENT

BACKGROUND OF THE INVENTION

1. Field of the Invention

The present invention relates generally to means of preventing rodents and other such pests from entering a recreational vehicle through the service compartment wherein access portals for waste, water, and electricity are present. More particularly, the present invention comprises various embodiments of a device for sealing such access ports within a recreational vehicle's service compartment thereby preventing rodents and other pests from gaining access to the recreational vehicle while providing a passage for utility conduits such as waste, water, and electricity.

2. Description of the Related Art

A recreational vehicle (RV) is a motor vehicle or trailer equipped with living space and amenities found in a home and provides a popular means of vacationing for families and couples alike. RVs provide all of the amenities of household living such as sleeping, cooking, entertaining, and bathing as well as storage of clothing, food, and other necessities for living along with the ability to bath oneself and receptacles to receive bodily waste or unclean water material (sewage) all within a vehicle that may be driven from one location to another. In order to provide this convenience RVs contain within them an electrical generator for the operation of refrigerators, stoves, air conditioning, water heaters, television, and other related components, a supply of water for the purposes of cooking, cleaning, and bathing for day to day living, and a storage container to hold sewage. However an RV may only function in a self-sufficient mode for a limited time until fuel for the electrical generator or water used for cooking, cleaning, and bathing are exhausted and need to be replenished or sewage needs to be properly disposed of. To indefinitely extend the number of days an RV may be used there exists specialized parks designed for RVs wherein an RV may enter and make use of the park's electrical and water sources and to dump any sewage stored within the RV into the park's sewage system.

To provide for the interconnect between the RV and the park's electrical, water, and sewage facilities RVs have what is called a "service compartment". The service compartment contains access ports for the passage of electrical, water, and sewage conduits in a single convenient location with standardized connectors for each of the conduits. The park likewise employs at each RV parking spot a utility structure containing matching standardized connectors to the park's supply of electricity and water along with the park's sewage facilities. It then becomes a simple matter for the operator of the RV by use of a standardized set of cables and hoses (conduits) to in effect replace the RV's utility needs with the park's utility sources. These conduits pass through one or more access ports within the RV's service compartment and are connected to the corresponding utility receptacle within the utility structure. Once fully connected a RV has an indefinite supply of electricity and water while also being able to dispose an indefinite amount of sewage.

Although such as arrangement greatly extends the amount of time an RV may spend "on the road" the access ports within the service compartment that the conduits pass through create a problem in that the access ports, in order to facilitate the passage of a conduit, is of a larger diameter than the conduit. As a result there is a void between the conduit and the edge of the access port. By means of this void unwanted animals and pests may traverse into the RV's service compartment and once inside the service compartment they may damage sensitive components and items stored within the service compartment or worse yet obtains a means of entry into the living area of the RV itself.

A number of different sealing devices have been developed in the past for use in environments different from that of the present invention. Once such device is found in U.S. Pat. No. 4,377,291 by Francis G. Albertini titled "Sealing Assembly". The Albertini patent discloses a mechanical sealing assembly for establishing a water-tight, rodent/insect-proof seal between one or more conduits such as cables and hoses and an access port. The assembly includes a resilient, compressible, cylindrical rubber bushing and a pair of flat plates on opposite sides of the bushing. The bushing has openings for the passage of conduits and slits in the bushing connect the opening to the perimeter of the bushing. Conduits are passed through the access port and are then forced through the slits in the bushing and into the passages in the bushing. Once the conduits have been inserted into the bushing the bushing is then positioned in the access port where a pair of flat plates, one positioned at the rear of the bushing and another at the front of the bushing, is then drawn together by bolts passing from the front plate to the rear plate causing the bushing to expand at its perimeter to effect a seal between the bushing and the access port. Such a design may be adapted for use in RVs there are a number of problems that would limits its use. First is that for very large conduits, such as sewage hoses, it would be impossible to force it through a slit and into the bushing. Another is that the thickness of the access ports in a RV's service compartment is rather thin making it difficult to properly expand the bushing to seal the access port. Finally the sealing assembly disclosed by Albertini requires the RV operator to perform a number of steps with the usage of tools making the regular use of the assembly difficult and cumbersome. Many of the other devices designed to form a seal between the perimeter of a conduit and the perimeter of the access port that provide passage for the conduit, like the Albertini patent, are designed more for walls in buildings, are to be permanently installed, and comprise a number of parts requiring tools and multiple steps for proper installation. These devices are inadequate when used by RV owners to quickly and temporally seal the space between the perimeter of a conduit and the perimeter of the access port that provide passage for the conduit without the use of tools.

A sealing device specifically designed for use in sealing the space between the perimeter of a conduit and the perimeter of the access port that provide passage for the conduit where the access port is in the service compartment of a RV is found in U.S. Pat. No. 8,128,132 by Jerry R. Cravens titled "Pest control seal for recreational vehicle". The Cravens' patent discloses a seal for an access port that is comprised of two components: first a relatively soft and resilient annular foam material which is compressed into the annular opening between the perimeter of the conduit and the perimeter of the access port that the conduit passes through, and second a relatively thin, hard retainer, which is attached to the rim of the access port. The foam material and retainer may be attached to each other, or may be installed as separate pieces held in place by compression and suitable fasteners. Furthermore the retainer may be formed as two semicircular components, or as a single annular piece. Unlike the Albertini patent where slits are provided to allow the conduit to be positioned within passages in the bushing the Cravens patent requires the annular foam material to be first inserted at one end of the conduit and positioned within the access port. The retainer must then be positioned about the rim of the access port if formed as two semicircular components or must be inserted at one end of the conduit and slid into positioned at the rim of the access port if formed as a single annular piece. Once in position the retainer is fastened to the rim of the access port using suitable fasteners. Although the Cravens patent is designed for use in RVs its design makes it difficult to be implemented by the RV owner. First the annular foam material must be inserted at one end of the conduit and slid into position. This approach is difficult with conduit such as sewage hoses where the surface of the hose is not uniform. Also the repeated action of sliding the annular foam material will cause unnecessary wear and tear on the foam material shortening its life span. Another problem is that the retainer must be fastened to the rim of the access port using tools increasing the complexity and time of installation. Finally the dimensions of the annular foam material and the retainer must match, that is an annular foam material designed for a half inch water hose cannot be mated with a retainer designed for a 4 inch sewage hose. This abundance of parts that must be matched for proper assembly may cause the whole to fail if a single part is missing or not of the appropriate size.

The present inventor is unaware of any seals adapted and configured to seal the gap between the perimeter of a conduit and the perimeter of the access port that it passes through that may be installed quickly, without tools, and is designed as a single piece.

BRIEF SUMMARY OF THE INVENTION

At its simplest embodiment the present invention, hereinafter named pest seal, consists of two halves wherein the length and width of the two halves when brought together is greater than the length and width of the access port in a RV's service compartment. The edge where the two halves come together contains one or more cutouts that are mirrored on the opposing edge so that when the two halves are brought together a conduit may pass through the pest seal by means of the cutout. The cutouts may be sized appropriately to allow for the passage of hoses and/or electrical cables of varying sizes and may be lined with a compressible foam material to fill in any small gap between the conduit and the pest seal. When the two halves are brought together they are attached by non-permanent means such as hook and loops, magnets, latches, snaps, and other attachment means that are known in the art. As access ports are located on the floor of the service compartment the pest seal will rest over the access port using friction provided by gravitational forces to stay in place. With this embodiment the RV owner may install the pest seal by simply bringing the two halves of the pest seal together about the conduit and then sliding the pest seal over the access port. If the attachment means requires a separate engagement step the RV owner will perform this step to complete the installation process. To uninstall the pest seal the RV owner will simply pull apart the two halves. If the attachment means requires a separate disengagement step the RV owner will perform this step to complete the uninstall process.

A second embodiment of the pest seal is like the first in that it consists of two halves wherein the length and width of the two halves when brought together is greater than the length and width of the access port in a RV's service compartment and further contains a semicircular flange permanently attached to each halves' underside. The semicircular flange is of a radius that is slightly less than the radius of the access port so as to be in close proximity to the perimeter of the access port. Additionally the flange is of a height so when the two halves are brought together within the access port the flanges only allows for small lateral movement of the pest seal when the conduit is agitated by external forces such as minor movements of the RV or with human contact as well as internal forces such as the rapid change in water pressure or movement. The edge where the two halves come together contains one or more cutouts that are mirrored on the opposing edge so that when the two halves are brought together a conduit may pass through the pest seal by means of the cutout. The cutouts may be sized appropriately to allow for the passage of hoses and/or electrical cables of varying sizes and may be lined with a compressible foam material to fill in any small gap between the conduit and the pest seal. When the two halves are brought together they are attached by non-permanent means such as hook and loops, magnets, latches, snaps, and other attachment means that are known in the art. As access ports are located on the floor of the service compartment the pest seal will rest over the access port using friction provided by gravitational forces to stay in place. In addition to the gravitational friction forces present the semicircular flanges present on the underside of both halves will only allow for small lateral movement of the pest seal. With this embodiment the RV owner may install the pest seal by simply bringing the two halves of the pest seal together about the conduit and then sliding the pest seal over the access port so that the flanges on the underside of each halve are in close proximity to the perimeter of the access port. If the attachment means requires a separate engagement step the RV owner will perform this step to complete the installation process. To uninstall the pest seal the RV owner will simply lift the pest seal out of the access port to a height so that the flanges are clear of the access port and then pull apart the two halves. If the attachment means requires a separate disengagement step the RV owner will perform this step prior to pulling apart the halves.

A third embodiment is like the first embodiment without the flanges or like the second embodiment with the flanges except that in the third embodiment the two halves are hinged together at one end along the edge where the two halves come into contact in the first and second embodiment. By hinging the two halves together the pest seal is stored and used as a single piece without the worries of losing one halve of a pair. With this embodiment the RV owner may install the pest seal by simply opening the two halves of the pest seal at the end opposite the hinge, maneuvering the conduit within the opening and into the proper cut out, closing the pest seal by bringing the two halves together, sliding the pest seal over the access port and if the flanges are present they are in close proximity to the perimeter of the access port. If the attachment means requires a separate engagement step the RV owner will perform this step to complete the installation process. To uninstall the pest seal the RV owner will simply open the pest seal and maneuver the conduit out of the pest seal. If the flanges are present as in the second embodiment the RV owner must lift the pest seal out of the access port to a height so that the flanges are clear of the access port and then open the pest seal to maneuver the conduit out of the pest seal. If the attachment means requires a separate disengagement step the RV owner will perform this step prior to opening the pest seal.

Further areas of applicability of the pest seal will become apparent from the detailed description provided hereinafter. It should be understood that the detailed description and specific examples, while indicating the preferred embodiment of the invention, are intended for purposes of illustration only and are not intended to limit the scope of the invention.

Neither this summary nor the following detailed description defines or limits the invention. The invention is defined by the claims.

BRIEF DESCRIPTION OF DRAWINGS

The present invention will become more fully understood from the detailed description and accompanying drawings, wherein.

DETAILED DESCRIPTION OF THE INVENTION

The following description of the preferred embodiment(s) is merely exemplary in nature and is in no way intended to limit the invention, its application, or uses.

Figure 1:
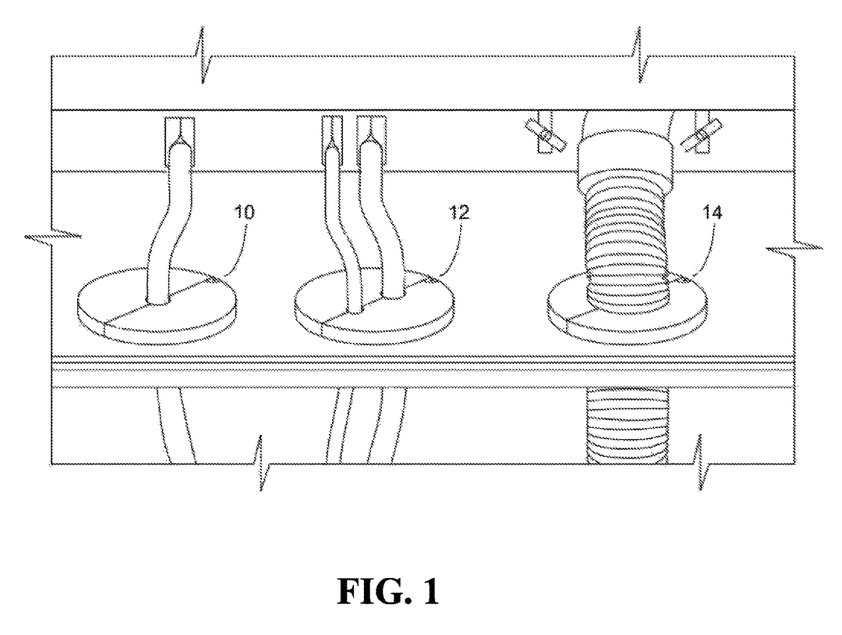
FIG. 1 shows the service compartment of a RV with three access portals where each access portal is sealed by the pest seal of the present invention.

FIG. 1 shows the service compartment of a RV with three access portals along the floor of the service compartment where each access portal is sealed by a pest seal of the present invention. Each access portal contains one or more conduits of varying sizes passing through the portal and outward of the RV. Each pest seal is comprised of two equal semicircular halves that are brought together along the linear portion of each halve and are hinged together at one end of the linear portion. Each halve has one or more semicircular cutouts arranged such that when the two halves are brought together the combined cutouts form a circular void. Pest seal 10 shows an embodiment that seals the access portal when a single conduit passes through the portal. Pest seal 12 shows an embodiment that seals the access portal when two conduits of varying thickness passes through the portal. Pest seal 14 shows an embodiment that seals the access portal when a single larger conduit passes through the portal.

Figure 2:
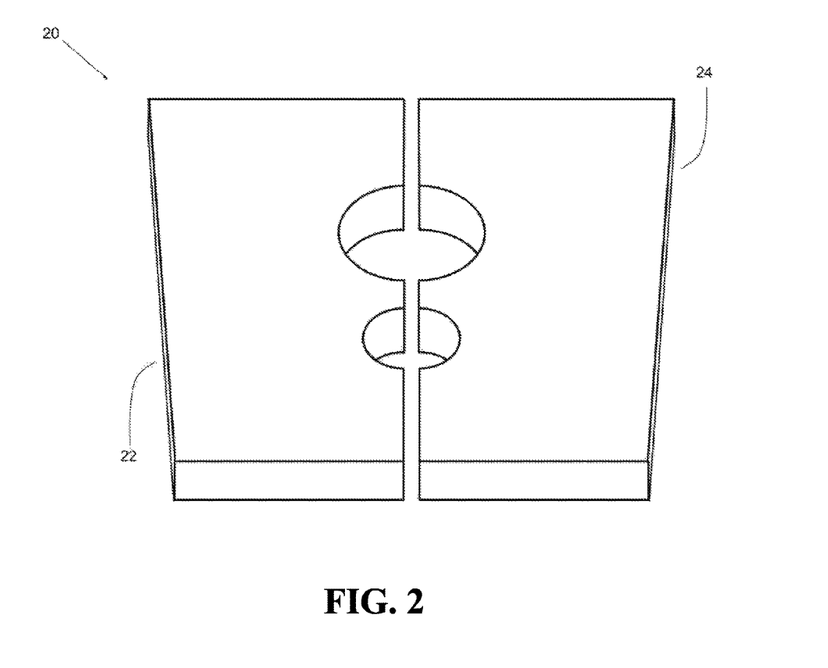
FIG. 2 shows the two halves of a rectangular embodiment of the pest seal with multiple cutouts.

FIG. 2 shows an embodiment of a pest seal referenced as 20 wherein the two halves, left halve 22 and right halve 24, are rectangular. Along the edge where left halve 22 and right halve 24 are brought together there exist one or more cutouts. Here pest seal 20 is shown with two cutouts in left halve 22 and two cutouts in right halve 24. The cutouts are semicircular and when left halve 22 is brought together with right halve 24 the cutouts in each halve combine to form a circular void whereby a conduit may pass through. The cutouts shown in FIG. 2 are of different radius so as to accommodate conduit of different widths. Pest seal 20 may be utilized by first passing the conduit(s) through the access portal and then bringing together left halve 22 and right halve 24 above the access portal such that the conduit(s) are positioned within the circular voids formed when the two halves are brought together and finally positioning pest seal 20 so that it rests over the access portal that is to be sealed.

Figure 3:
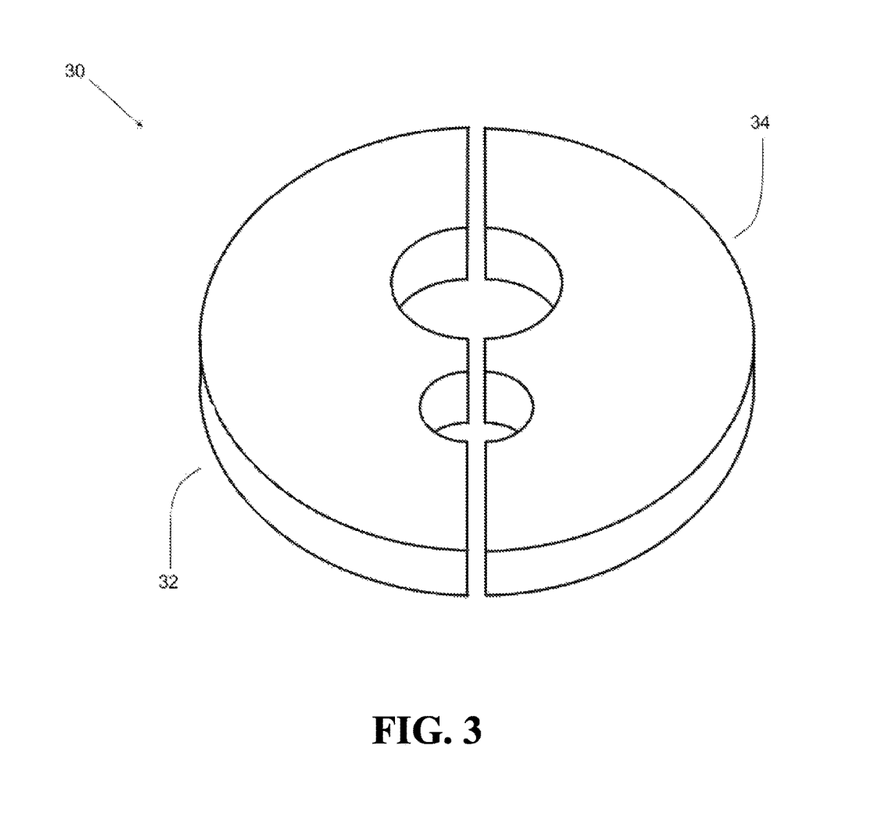
FIG. 3 shows the two halves of a circular embodiment of the pest seal with multiple cutouts.

FIG. 3 shows an embodiment of a pest seal referenced as 30 wherein the two halves, left halve 32 and right halve 34, are semicircular. Along the linear edge where left halve 32 and right halve 34 are brought together there exist one or more cutouts. Here pest seal 30 is shown with two cutouts in left halve 32 and two cutouts in right halve 34. The cutouts are semicircular and when left halve 32 is brought together with right halve 34 the cutouts in each halve combine to form a circular void whereby a conduit may pass through. The cutouts shown in FIG. 3 are of different radius so as to accommodate conduit of different widths. Pest seal 30 may be utilized by first passing the conduit(s) through the access portal and then bringing together left halve 32 and right halve 34 above the access portal such that the conduit(s) are positioned within the circular voids formed when the two halves are brought together and finally positioning pest seal 30 so that it rests over the access portal that is to be sealed.

Figure 4:
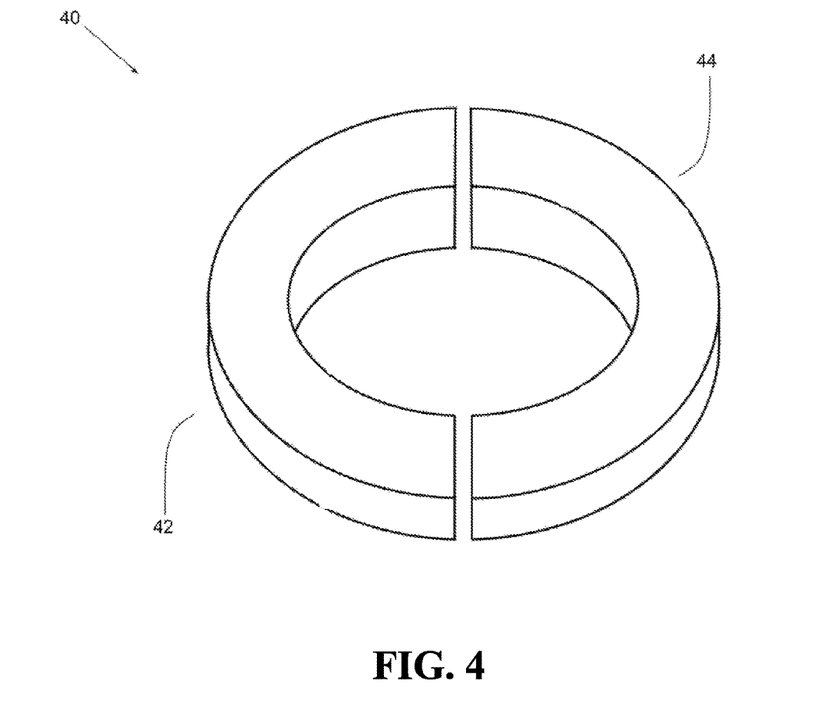
FIG. 4 shows the two halves of a circular embodiment of the pest seal with a single cutout.

FIG. 4 shows an embodiment of a pest seal referenced as 40 wherein the two halves, left halve 42 and right halve 44, are semicircular. Moreover along the linear edge where left halve 42 and right halve 44 are brought together there exists a single cutout in each halve. The cutout is semicircular and when left halve 42 is brought together with right halve 44 the cutouts in each halve combine to form a circular void whereby a conduit may pass through. Pest seal 40 may be utilized by first passing the conduit through the access portal and then bringing together left halve 42 and right halve 44 above the access portal such that the conduit is positioned within the circular void formed when the two halves are brought together and finally positioning pest seal 40 so that it rests over the access portal that is to be sealed.

Figure 5:
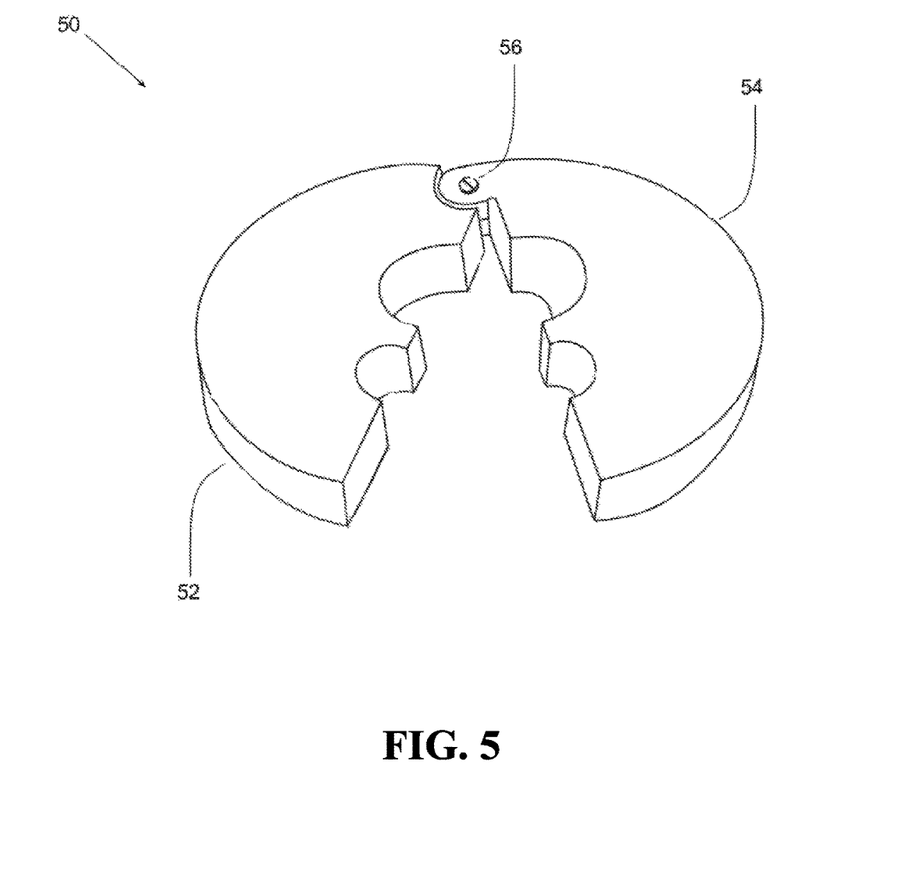
FIG. 5 shows the two halves of a circular embodiment of the pest seal with a multiple cutouts and where the two halves are hinged at one end.

FIG. 5 shows an embodiment of a pest seal referenced as 50 wherein the two halves, left halve 52 and right halve 54, are semicircular. Along the linear edge where left halve 52 and right halve 54 are brought together there may exist one or more cutouts. Here pest seal 50 is shown with two cutouts in left halve 52, two cutouts in right halve 54, and hinge 56 at one end of the linear edge joining the two halves. The cutouts are semicircular and when left halve 52 is brought together with right halve 54 the cutouts in each halve combine to form a circular void whereby a conduit may pass through. The cutouts shown in FIG. 5 are of different radius so as to accommodate conduit of different widths. Pest seal 50 may be utilized by first passing the conduit(s) through the access portal and then bringing together left halve 52 and right halve 54 above the access portal such that the conduit(s) are positioned within the circular voids formed when the two halves are brought together and finally positioning pest seal 50 so that it rests over the access portal that is to be sealed.

Figure 6:
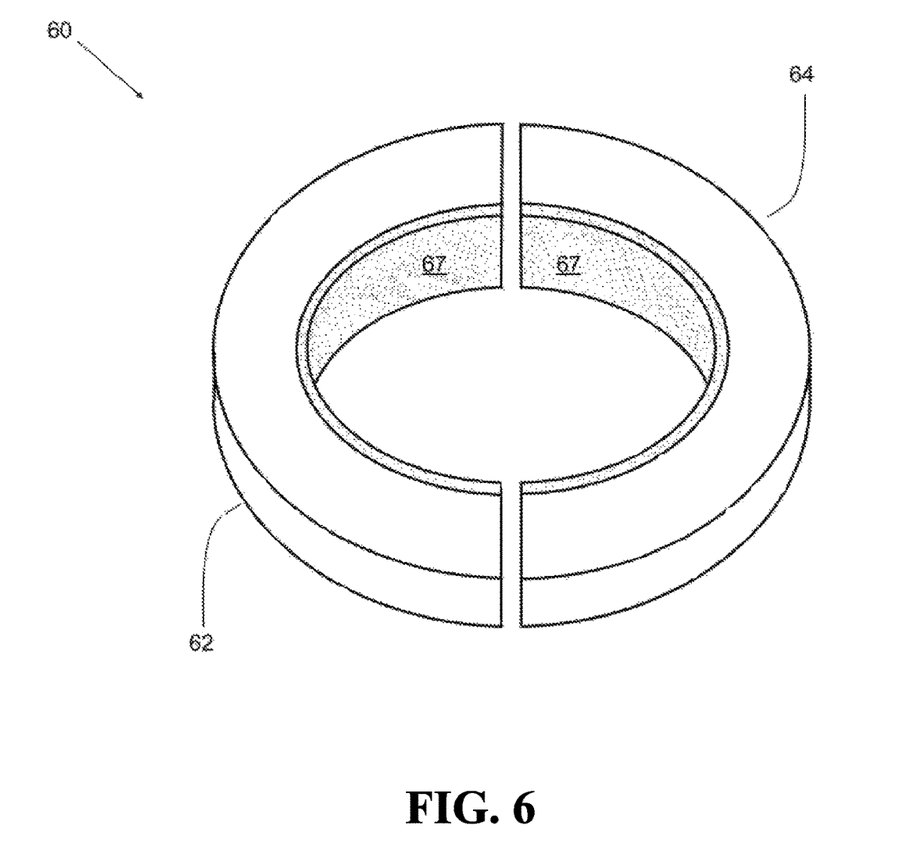
FIG. 6 shows the two halves of a circular embodiment of the pest seal with a single cutout that is lined with compressible foam.
Figure 7:
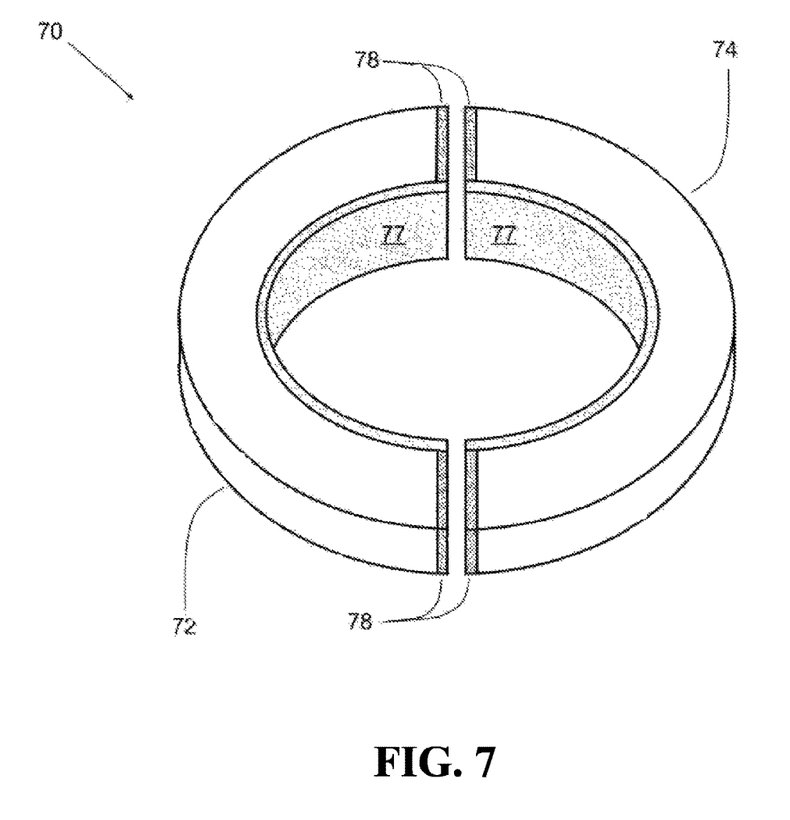
FIG. 7 shows the two halves of a circular embodiment of the pest seal with a single cutout that is lined with compressible foam and utilizes magnets for joining the two halves together.

In the preceding embodiments if the radius of the conduit passing through the circular voids formed when bring the two halves together is much smaller than the radius of the circular void there may exist enough of a gap for rodents to pass between the edge of the conduit and the edge of the circular void. FIG. 6 shows an embodiment of a pest seal referenced as 60 wherein the two halves, left halve 62 and right halve 64, are semicircular. Moreover along the linear edge where left halve 62 and right halve 64 are brought together there exists a single semicircular cutout in each halve and the wall of the cutout in each halve is lined with compressible foam 67. When left halve 62 is brought together with right halve 64 the cutouts in each halve combine to form a circular void whereby a conduit may pass through. Space that may exist between the circumference of the conduit and the circular void will be occupied by compressible foam 67. Pest seal 60 may be utilized by first passing the conduit through the access portal and then bringing together left halve 62 and right halve 64 above the access portal such that the conduit is positioned within the circular void formed when the two halves are brought together and finally positioning pest seal 60 so that it rests over the access portal that is to be sealed.

Figure 8:
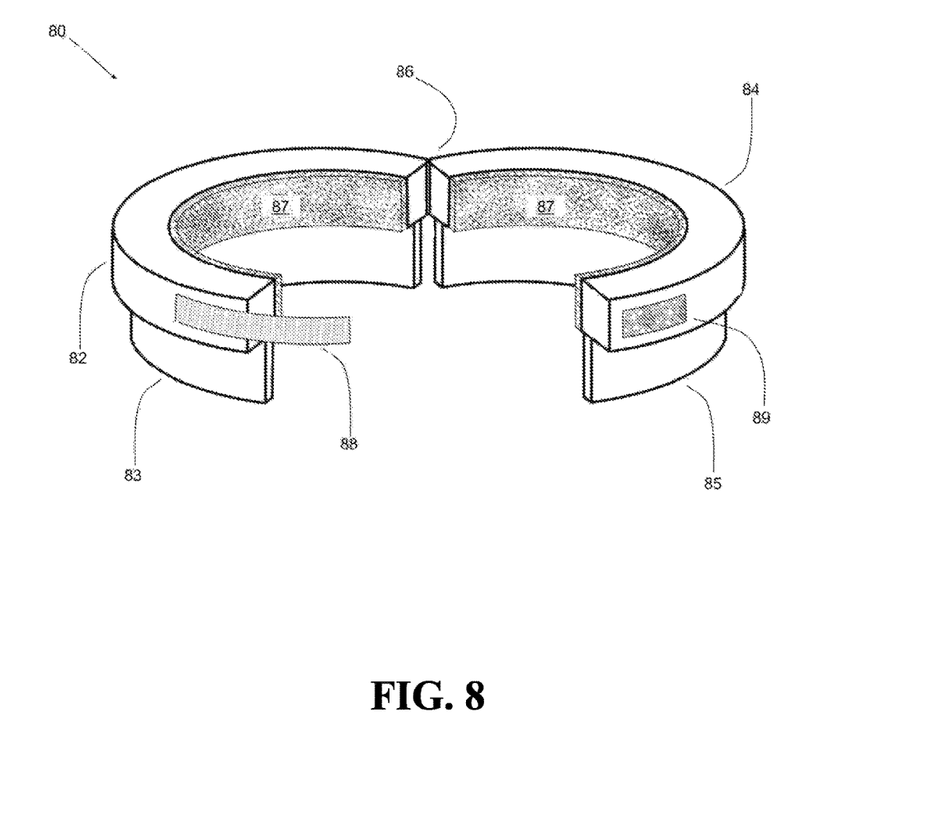
FIG. 8 shows the two halves of a circular embodiment of the pest seal that are hinged together at one end with a single cutout that is lined with compressible foam and utilizes hook and loop fabric to join the two halves together.

In the preceding embodiments of pest seals 20, 30, 40, 50, 60, and 70 the pest seal simply rested on top of the access portal. Lateral forces created by the movement of liquids passing through a conduit, the activities of humans within the RV, or external forces such as winds may cause the pest seal to move from its position to such a degree that a gap between the edge of the pest seal and the edge of the access port may form of a sufficient size to allow for the infiltration of rodents into the service compartment. To allow for only small lateral movement of the pest seal that has been positioned over an access portal a flange may be added to the lower surface of the pest seal such that the flange protrudes into the access portal and is of such a radius so when a lateral force is applied to the pest seal the flange will quickly come into contact with the edge of the access port prevent any further lateral movement. FIG. 8 shows an embodiment of a pest seal referenced as 80 wherein the two halves, left halve 82 and right halve 84, are semicircular. Along the linear edge where left halve 82 and right halve 84 are brought together there may exist one or more cutouts. Here pest seal 80 is shown with a single cutout in left halve 82, a single cutout in right halve 84, and hinge 86 at one end of the linear edge joining the two halves. The walls of the cutouts are lined with compressible foam 87. Hinge 86 is not visible in FIG. 8. The cutouts are semicircular and when left halve 82 is brought together with right halve 84 the cutouts in each halve combine to form a circular void whereby a conduit may pass through. Below left halve 82 is left flange 83 of such a radius so that it resides within the access port and of such a height so that it substantially protrudes into the access port. Below right halve 84 there exists right flange 85 with the same attributes as left flange 83. To join left halve 82 with right halve 84 pest seal 80 utilizes a hook and loop fabric where hook fabric 88 may be pressed against loop fabric 89 thus preventing the two halves from separating. Pest seal 80 may be utilized by first passing the conduit through the access portal, bringing together left halve 82 and right halve 84 above the access portal such that the conduit is positioned within the circular void formed when the two halves are brought together, positioning pest seal 80 so that left flange 83 and right flange 85 are positioned within the access portal that is to be sealed, and finally joining the two halves together by pressing hook fabric 88 against loop fabric 89.

In the preceding embodiments of pest seals 20, 30, 40, 50, 60, and 70 the pest seal simply rested on top of the access portal. Lateral forces created by the movement of liquids passing through a conduit, the activities of humans within the RV, or external forces such as winds may cause the pest seal to move from its position to such a degree that a gap between the edge of the pest seal and the edge of the access port may form of a sufficient size to allow for the infiltration of rodents into the service compartment. To prevent any lateral movement of the pest seal that has been positioned over an access portal a flange may be added to the lower surface of the pest seal such that the flange protrudes into the access portal and is of such a radius so when a lateral force is applied to the pest seal the flange will quickly come into contact with the edge of the access port prevent any further lateral movement. FIG. 8 shows an embodiment of a pest seal referenced as 80 wherein the two halves, left halve 82 and right halve 84, are semicircular. Along the linear edge where left halve 82 and right halve 84 are brought together there may exist one or more cutouts. Here pest seal 80 is shown with a single cutout in left halve 82, a single cutout in right halve 84, and hinge 86 at one end of the linear edge joining the two halves. The walls of the cutouts are lined with compressible foam 87. Hinge 86 is not visible in FIG. 8. The cutouts are semicircular and when left halve 82 is brought together with right halve 84 the cutouts in each halve combine to form a circular void whereby a conduit may pass through. Below left halve 82 is left flange 83 of such a radius so that it resides within the access port and of such a height so that it substantially protrudes into the access port. Below right halve 84 there exists right flange 85 with the same attributes as left flange 83. To join left halve 82 with right halve 84 pest seal 80 utilizes a hook and loop fabric where hook fabric 88 may be pressed against loop fabric 89 thus preventing the two halves from separating. Pest seal 80 may be utilized by first passing the conduit through the access portal, bringing together left halve 82 and right halve 84 above the access portal such that the conduit is positioned within the circular void formed when the two halves are brought together, positioning pest seal 80 so that left flange 83 and right flange 85 are positioned within the access portal that is to be sealed, and finally joining the two halves together by pressing hook fabric 88 against loop fabric 89.

Figure 9:
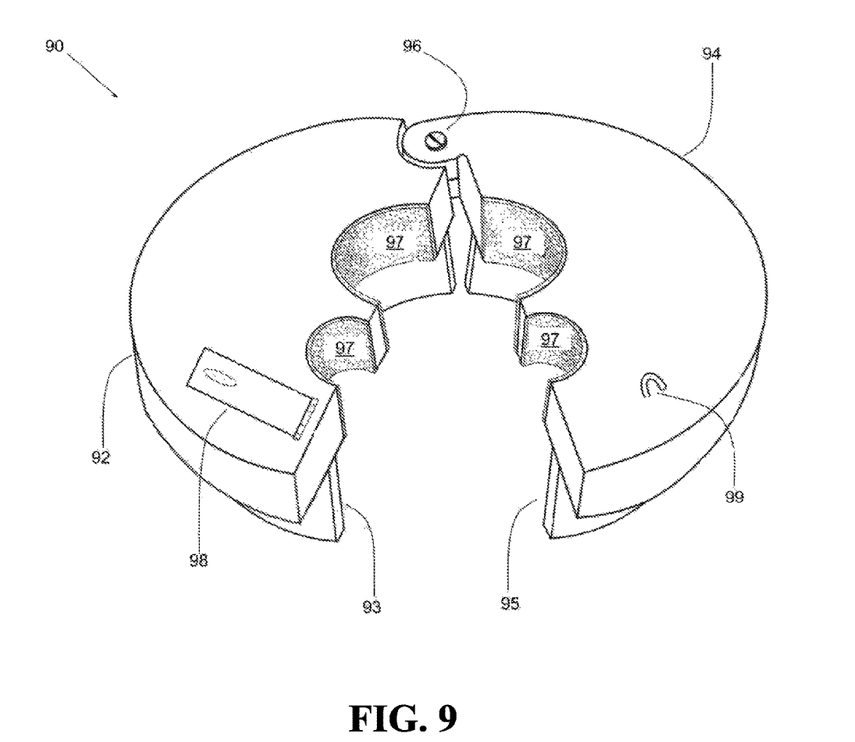
FIG. 9 shows the two halves of a circular embodiment of the pest seal that are hinged together at one end with multiple cutouts that are lined with compressible foam and utilizes a hasp latch to join the two halves together.

FIG. 9 shows an embodiment of a pest seal referenced as 90 wherein the two halves, left halve 92 and right halve 94, are semicircular. Along the linear edge where left halve 92 and right halve 94 are brought together there may exist one or more cutouts. Here pest seal 90 is shown with a two cutouts in left halve 92, two cutouts in right halve 94, and hinge 96 at one end of the linear edge joining the two halves. The walls of the cutouts are lined with compressible foam 97. The cutouts are semicircular and when left halve 92 is brought together with right halve 94 the cutouts in each halve combine to form a circular void whereby a conduit may pass through. Below left halve 92 is left flange 93 of such a radius so that it resides within the access port and of such a height so that it substantially protrudes into the access port. Below right halve 94 there exists right flange 95 with the same attributes as left flange 93. To join left halve 92 with right halve 94 pest seal 90 utilizes a hasps where hasps plate 98 may be flipped onto receiving loop 99 thus preventing left halve 92 and right halve 94 from separating. Pest seal 90 may be utilized by first passing the conduit(s)

through the access portal, bringing together left halve 92 and right halve 94 above the access portal such that the conduit(s) are positioned within the circular voids formed when the two halves are brought together, positioning pest seal 90 so that left flange 93 and right flange 95 are positioned within the access portal that is to be sealed, and finally joining left halve 92 to right halve 94 by flipping hasps plate 98 onto receiving loop 99.

Figure 10:
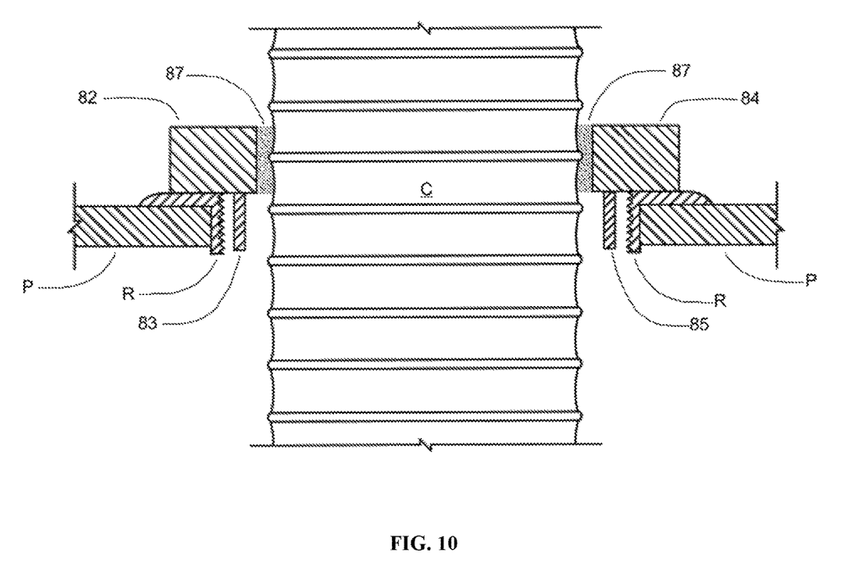
FIG. 10 shows a side elevation view of the pest seal of FIG. 8 when positioned into an access port within the service compartment.

FIG. 10 shows an elevation view of pest seal 80 as shown in FIG. 8 when positioned on an access portal within the service compartment. FIG. 10 shows flooring P of the service compartment with a gap therein that comprises the access portal and conduit C passing therethrough. About the edge of flooring P is female threaded ring R that receives male threaded cover plate (not shown) that is threaded into ring R to seal the access portal while the RV is in motion. To install pest seal 80 conduit C is pulled through the access portal slightly beyond its rest position. Pest seal 80 is then securely closed about conduit C by use of hook fabric 88 and loop fabric 89 shown in FIG. 8. Compressible foam 87 occupies the gap between left halve 82 and conduit C as well as the gap between right halve 84 and conduit C. Conduit C is then returned to its rest position so that pest seal 80 is within the access portal as shown in FIG. 10. Left flange 83 and right flange 85 ensures that pest seal 80 remains over the access portal when conduit C is subjected to lateral forces.

The embodiments disclosed herein are understood to be illustrative and not limiting in any sense. It is intended that the scope of the present invention is not limited by the above described embodiments but by the claims and it covers all modifications equivalent to the claims.

The invention claimed is:

1. A pest control device in combination with a recreational vehicle, the combination comprising:
   a recreational vehicle including:
      a service compartment having a flooring defining at least one access port therethrough; and
      at least one conduit removably installed through the access port;
   a device comprising of:
      two halves comprising a length, width, and thickness with at least one linear edge where the combined width and length of the halves is greater than the width and length of the access port when the halves are brought together along their respective linear edge; and
      at least one semicircular cutout along the linear edge of each halve having a surface substantially parallel to said conduit and containing a layer of compressible foam facing said conduit, the cutouts in each half being in alignment such that when the halves are brought together along their respective linear edge a circular void is formed for passage by said conduit;
      a means for releasably coupling the halves along the linear edge; and
      said device to operate with said access port and to occupy the gap between said conduit and edge of said access port.

2. The pest control device of claim 1 wherein the halves are rectangular, semicircular, or some combination thereof.

3. The pest control device of claim 1 wherein the halves are hinged together at one end of the linear edge.

4. The pest control device of claim 1 wherein a flange is attached to the lower surface of each halve the flange protruding substantially within the access port and proximate to the edge of the access port.

5. A pest control device in combination with a recreational vehicle, the combination comprising:
   a recreational vehicle including:
      a service compartment having a flooring defining at least one access port therethrough; and
      at least one conduit removably installed through the access port;
   a device consisting of:
      two semicircular halves comprising a length, width, and thickness hinged together at one end of the halves' linear portion where the combined width and length of the semicircular halves is greater than the width and length of the access port when the semicircular halves are brought together along their respective linear edge; and
      at least one semicircular cutout along the linear edge of each halve having a surface substantially parallel to said conduit and containing a layer of compressible foam facing said conduit, the cutouts in each half being in alignment such that when the halves are brought together along their respective linear edge a circular void is formed for passage by said conduit;
      a semicircular flange attached to the lower surface of each halve the flange protruding substantially within the access port and proximate to the edge of the access port;
      a means for releasably coupling the semicircular halves along the linear edge; and
      said device to operate with said access port and to occupy the gap between outer diameter of said conduit and diameter of said access port.

* * * * *